Jan. 5, 1971  A. WINSEL  3,553,026
METHOD OF REMOVING WATER OF REACTION DURING FUEL CELL OPERATION
Filed Dec. 12, 1967  2 Sheets-Sheet 1

INVENTOR
AUGUST WINSEL
BY
ATTORNEYS.

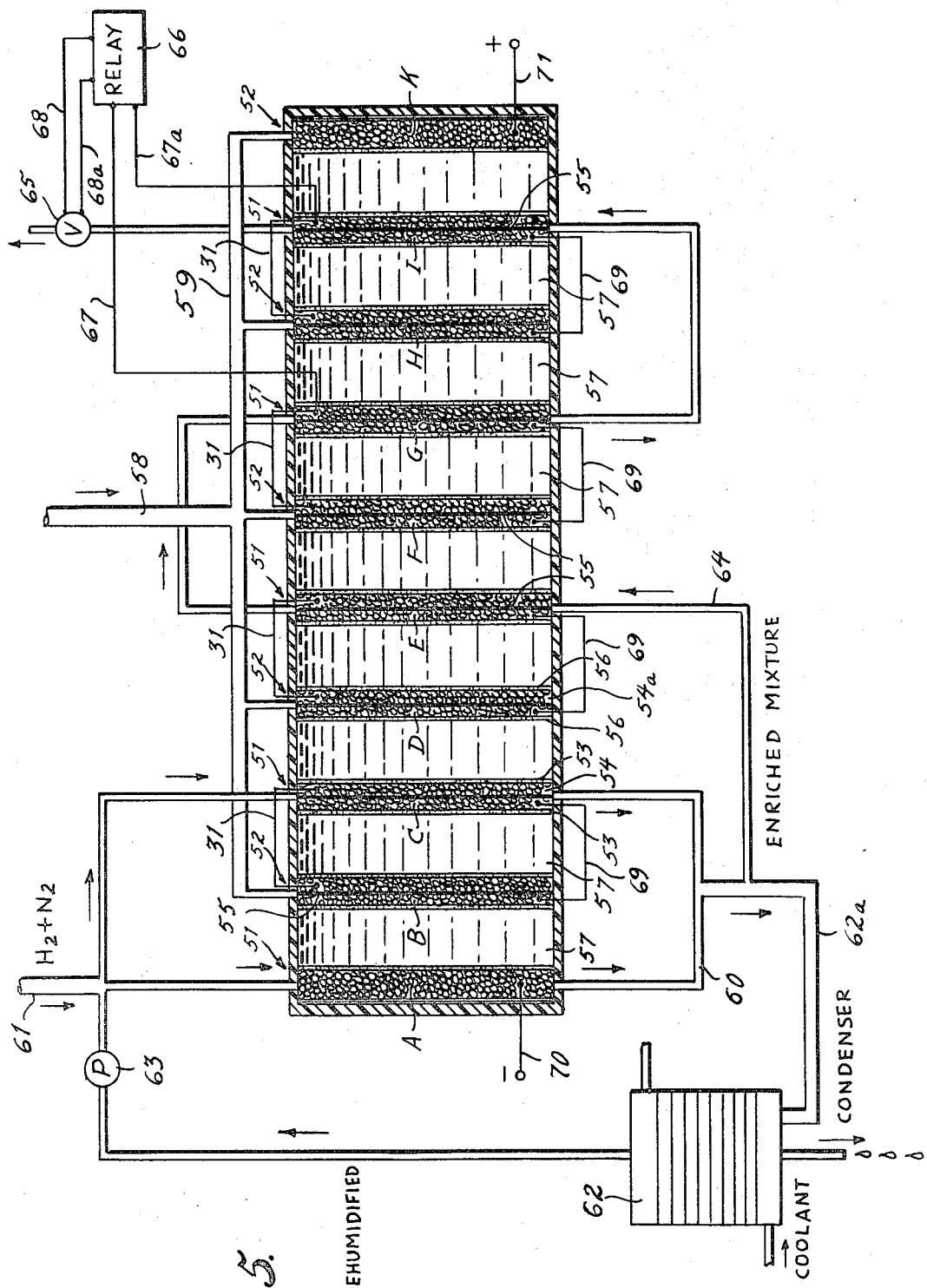

United States Patent Office 3,553,026
Patented Jan. 5, 1971

3,553,026
METHOD OF REMOVING WATER OF REACTION DURING FUEL CELL OPERATION
August Winsel, Kelkheim, Germany, assignor to Varta Aktiengesellschaft, Frankfurt am Main, Germany, a corporation of Germany
Filed Dec. 12, 1967, Ser. No. 690,008
Claims priority, application Germany, Dec. 14, 1966,
V 32,551
Int. Cl. H01m 27/02
U.S. Cl. 136—86                        16 Claims

ABSTRACT OF THE DISCLOSURE

A process and a fuel cell battery comprising porous gas diffusion electrodes which is operated to remove water of reaction by passing one or both gas mixtures containing gaseous reactants and inert gas through a first group or groups of interconnected gas spaces of electrodes of equal polarity, dehumidifying a portion or all of the effluent gas mixture containing gaseous reactant, recycling dehumidified gas to the first group of gas spaces and passing a portion of the effluent gas from the first group of gas spaces to a second group of gas spaces connected in series for gas flow, and venting the inert gases from the last gas space in the series with a minimum loss of the reactant gases.

---

Figure 1:
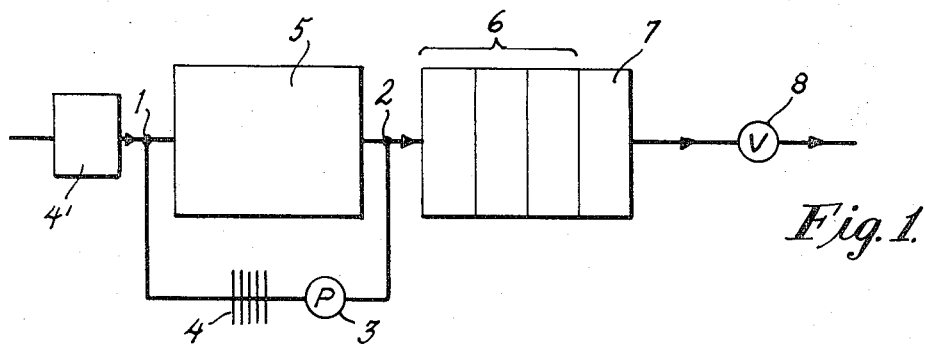

This invention relates to a novel fuel cell battery which contains a plurality of gas diffusion electrodes and means for the removal of the reaction water and of inert gaseous impurities from the battery and to a process for the operation of a fuel cell battery comprising gas diffusion electrodes with the simultaneous removal of the reaction water and of the inert gas constituents from at least one of the reactant gases.

It is known in the prior art that fuel cell batteries employing gas diffusion electrodes may be operated by continuously feeding a suitable gaseous fuel or other reactant, for instance, hydrogen gas or an oxidant, respectively, for instance, air or an oxygen containing gas to the gas spaces of the respective electrodes. The water formed in the electrochemical reaction which takes place in the fuel cell (commonly designated as water of reaction) is taken up by the aqueous electrolyte of the battery which is, in this manner, gradually diluted and should be reconcentrated for continued effective operation of the battery.

According to published German patent application DAS 1,067,490, the water of reaction may be removed from the individual cells, or from the battery, respectively, by the circulation of one of the reactant gases through the respective gas spaces of the corresponding electrodes in the cells and through a cooled condenser provided in the gas recirculation system. While in the gas spaces of the electrodes, the circulated gas absorbs water vapor vaporized from the electrolyte in an amount dependent on the partial vapor pressure of the aqueous electrolyte at the temperature and pressure at which the battery is operated. Thus, water vapor passes through the electrolyte menisci within the pores of the porous electrodes into the flowing gas. When the saturated gas with water vapor is passed through a cooled condenser, that part of the vapor which exceeds the saturation pressure of the water vapor, at the temperature to which the gas cools in the condenser, is condensed. The condensate then is removed from the condenser in suitable manner.

If the rate of evaporation of water from the electrolyte achievable by the recirculation of one of the reactant gases, for instance, through the anodes, is not sufficient to keep the electrolyte volume constant, it is also possible to recirculate the second reactant gas in a separate, independent recirculating system in the above-described manner through a separate condenser, which permits the removal of further quantities of reaction water from the battery. If hydrogen gas and oxygent gas are used as the reactant gases, the hydrogen gas is circulated through a first recirculating system comprising the gas spaces of the hydrogen electrodes or anodes, a first gas-recirculating pump and a first condenser; the oxygen gas is circulated through a separate recirculating system comprising the gas spaces of the oxygen electrodes or cathodes, a second gas-recirculating pump and a second condenser. In this manner, water of reaction is removed from both gases.

The above-described known method of removing the reaction water from the battery leads to difficulties when the reactant gas recirculated through all gas spaces of the electrodes of one polarity for water removal contains inert constituents, that is, gaseous components which do not react in the cells of the battery. Such is commonly the case with industrial fuel gas mixtures which contain in admixture with hydrogen, for instance, carbon mono- or dioxide and nitrogen. A similar situation exists with gaseous oxidants like oxygen mixtures, or air. The concentration of the inert gas component increases in the course of the continued circulation and recirculation of the gas stream and must be removed therefrom for the cells to continue to operate. If carried to an extreme, the battery would cease to operate for want of reaction gas. Therefore, when water is removed from the system, by recirculation of a mixture of reactant and inert gas, it cannot be avoided that considerable amounts of the reactant gas are also lost concurrently with venting the inert gas components from the battery. This problem results from the fact that the electrical output of the electrodes gradually decreases because of increased polarization of the electrodes due to the inert gases as their concentration in the circulated gas mixture increases. It is, therefore, necessary to vent the inert gases from the battery while the concentration of inert gases in the gas mixture is sufficiently low prior to and in order to avoid substantial losses in cell output. Thus, together with the inert gas, a proportion of reactive gas is unavoidably released. This is, of course, undesirable.

As is readily apparent in the prior art method, the concentration of the inert gas component in the reactant gas is essentially uniform at any one time in all the cells of the battery, and the concentration of the inert gas component in the reactant gas fed to all cells increases with increasing load.

From U.S. Pat. 3,317,348, it is known to operate the fuel cell batteries containing gas-diffusion electrodes in such manner that the impure reactant gas containing an inert, unreactive component, for instance, air in which oxygen is the reactant, is successively fed to the gas spaces of the individual electrodes of identical polarity; that is, the gas spaces of the electrodes of identical polarity are connected communicatively in series so that each electrode of a given polarity is fed the reactant gas from a preceding electrode of the same polarity. As the gas, for instance, air, passes successively through the gas spaces of the electrodes, part of the reactant gas, for instance, the oxygen, is consumed and the concentration of the inert component, for instance, nitrogen, increases as a result thereof. The reactant gas mixture becomes enriched in the inert component, for instance, nitrogen as the oxygen is consumed, and is vented from the gas space of the last electrode in the series and released into the atmosphere. Before this venting occurs, a higher concentration or cushion of inert gas is established in the gas space of the last electrode.

The formation of the cushion of inert gas in the last electrode can be controlled by means of the decrease of the electrical output of this electrode resulting from the relatively low concentration of the reactive gas in the gas space of this electrode. If the electrodes are electrically connected in series, the decrease of the electrical output is detected by an increase of the polarization of the last electrode, as compared with the preceding electrode in the series, the electrical current flowing through all the electrodes being the same in this case. If the electrodes are electrically connected in parallel, the decrease of the electrical output of the last electrode through which the gas mixture being highest in the inert component flows, can be detected by a decrease of the current flowing through this electrode. Since the concentration of the inert gas increases along the way through the series of electrodes, it is thereby assured that the polarizing cushion of inert gases establishes itself first in the last electrode of the series.

In accordance with this method of removing the inert gas component, it is not possible to remove at the same time the reaction water by the hereinbefore described method of circulating a reactant gas through a condenser. The necessary recirculation of all of the gas through all the gas spaces of electrodes of the battery with equal polarity prevents the formation of a cushion of inert gas in the gas space of any one selected electrode, and in all gas spaces contained in this recirculation system a nearly equal concentration of the inert gas is established.

It is an object of the present invention to provide a fuel cell battery which provides for the removal both of the reaction water and of the inert gas with a minimum loss of reactant gas.

It is another object of the invention to provide a novel process for the operation of a fuel cell battery which process provides for the removal of the reaction water by the circulation of at least one reactant gas and inert gas containing mixture and at the same time provides for the removal of the inert gas component with a minimum loss of reactant gas.

Other objects will become apparent from the attached drawing and from the detailed description of the invention.

In accordance with the invention these objects have been attained, and the difficulties described above substantially overcome. In view of the obstacles to an efficient solution described above, the process and apparatus of this invention are considered unobvious.

The invention provides a fuel cell battery which comprises a plurality of porous gas diffusion electrodes, where gas spaces of electrodes of identical polarity form a first group and a second group of gas spaces. The first group of at least one gas space together with means for removing water vapor, e.g. a condenser, drying agents, and gas forwarding and conduit means forms a gas recirculation system which is connected to a conduit supplying gas to both groups of gas spaces. The second group of at least one gas space is interconnected in series with respect to gas flow by gas conduit means and one end of the series of gas spaces is connected to said recirculation system and the other end is connected to gas outlet valve means.

The term "gas space" as used in this description and in the claims designates the gas filled part of the pores of the porous gas diffusion electrodes and also the gas filled volume of gas chamber attached to the gas side surface of the electrode, if such is present.

In an embodiment of the battery of the invention, at least part of the gas spaces of the electrodes of the first group advantageously also are communicatively connected in series. Furthermore, the battery advantageously may contain a second, independent, circulation system, and a second series of gas spaces connected thereto in the manner described, in which the second reactant gas in mixture with an inert gas is circulated for reaction water removal, and subsequently the mixture enriched with the inert gaseous component is vented from the last gas space of the second series. In this embodiment, the two reactant gases preferably are flowed countercurrently through the cells of the battery.

The process of the invention comprises flowing at least one reactant gas containing mixture, for instance, a fuel through a first group of gas spaces of gas diffusion electrodes, taking up water vapor by the gas mixture therein, dehumidifying a portion of the effluent gas mixture which comprises reaction gas, water vapor and inert gas by passage through suitable water vapor removal means, mixing the dehumidified gaseous mixture with fresh reaction gas and reflowing it through the first group of gas spaces while passing a portion of the effluent gas through a second group of gas spaces of gas diffusion electrodes, the gas spaces of which are connected in series, and venting from the last gas space of said series inert gas and residual reaction gas at preselected times. The venting step of the process is generally carried out intermittently. Preferably, essentially all of the reaction water is removed from the system.

Suitable means for removal of water vapor from a mixture of gases are well-known in the art. Condensors cooled with water or other coolants, vessels filled with drying agents, such as silica gel, and others may be used in the process and apparatus of this invention.

The drawings FIGS. 1, 2, 3 and 4 are diagrammatic representations of various embodiments of the invention.

FIG. 5 is a diagrammatic elevation of the fuel cell battery.

The present invention provides a novel process for the removal of the inert gases from the reactant gas and of the reaction water carried as water vapor from the electrolyte during the operation of a fuel cell battery comprising a plurality of porous gas-diffusion electrodes. In the process, a reaction gas comprising an inert gaseous component is circulated through the gas spaces of a group of electrodes of identical polarity, the group comprising at least one electrode, and thereafter through a condenser for the removal of reaction water by condensation. Part of the circulating feed gas is thereafter led successively and in series through the gas spaces of a second group of gas diffusion electrodes of identical polarity and of the same polarity as the first group of electrodes, said second group also comprising at least one electrode. When the concentration of the inert gaseous component has reached a predetermined value in the last gas space in the series of the gas spaces of the second group, the gas mixture comprising inert gas is vented therefrom.

During the passage of the reaction gas in the second group of gas spaces, the concentration of the inert gaseous component increases from gas space to gas space until the last gas space wherein the concentration is highest and a cushion of inert gas is formed; conversely, during this passage of reactant gas in the second group of gas spaces, the concentration of reactant gas gradually decreases from gas space to gas space.

The process of the invention permits both the removal of the reaction water in a condenser comprised in a gas circulation system and of the inert gases, when they have formed a cushion of gases of sufficiently high concentration in the last gas space of the second group cell of the fuel cell battery system. In this process, the gas spaces of one or more gas diffusion electrodes of identical polarity of a fuel cell battery form a first group which is connected to the reactant gas inlet, and a portion or all of the gas mixture effluent from said first group and containing water of reaction is then circulated through a condenser where the water is condensed out. The dehumidified gas mixture containing inert and reactant gas and residual water vapor is refed to the first group of gas spaces. Part of this gas mixture can also be fed directly to the second group of gas spaces. Alternatively a portion of the gas emanating from the first group of gas spaces is not passed through the condenser and is passed through a second group of gas spaces which are communicatively connected in series. During passage in this group of gas spaces, the reactant gas stream becomes further enriched in inert gas content as a result of the consumption by electrochemical reaction of the reactant gas in the electrodes. The accumulated inert gas together with residual reactant gas is vented out of the gas space of the last electrode of the series when its concentration in this gas space is high enough to produce a predetermined decrease of the electrical output. This decrease is measured at a suitable electrode, as the last electrode or at the penultimate electrode.

It is one of the distinguishing features of the process of the invention that the vented gas comprises a major proportion of inert gas, and a minor proportion of reactant gas; generally the proportion of inert gas being at least about 50%, more often and preferably at least about 90% by volume. Ideally the gas vented comprises essentially only inert gas. The inert gas may be a single gas or a mixture of inert gases, such as of any gas that is not reactive in the electrochemical reaction, for instance, nitrogen, carbon dioxide and the like.

In one of the advantageous embodiments of the invention, the gas is first carried for removal of the reaction water, through a gas circulation system in which at least part of the gas spaces of the system of the electrodes of identical polarity are communicatively connected in series. In this manner, a certain partial, initial enrichment of the gas stream with inert gas is achieved in the gas circulation system, the enrichment being thereafter continued in the second group of gas spaces. In this embodiment of the invention, the second group of gas spaces may, therefore, comprise a smaller number of gas spaces than in the corresponding arrangement wherein the first group of gas spaces are arranged all in parallel.

FIG. 1 of the attached drawing illustrates the combination of the gas spaces of the electrodes of identical polarity in two separate groups as has just been described. The fresh reactant gas-containing mixture is introduced into the battery from supply source 4' and flows through the gas spaces 5 of the first group of gas spaces, in which the gas spaces 5 are communicatively connected in parallel, or, advantageously, at least in part in series. A portion of the gas effluent from the first group is drawn off from this group at 2 by means of pump 3, forwarded by the pump through condenser 4 and returned at 1 partly dehumidified, together with the fresh reactant gas from supply source 4' into the gas spaces of the first group. The gaseous portion which is not taken off at 2 and which has a reduced content of reactant gas as a result of the electrochemical reaction for the generation of electrical power taking place in the electrodes of the first group is introduced into the second group formed by gas spaces 6 and 7 which are communicatively connected in series. As the gas mixture proceeds through gas spaces 6 of the second group, the gas stream gradually becomes depleted in gaseous reactant and enriched in inert gas content. This increase of inert gas results in the formation of a cushion of inert gas in the gas space 7 of the second group of the fuel battery. The inert gas and the residual reactant gas are vented through outlet valve 8 into the atmosphere when a predetermined decrease in the electrical output of this electrode has been reached, as compared with the electrode with the gas space which precedes the last gas space 7 of the second group.

In accordance with one of the embodiments of the invention, when the porous gas-diffusion electrodes are oxygen electrodes, the formation of the cushion of inert gas and the release of inert gas to the extent desired can be detected and controlled by the increase of the polarization of the electrode, the pores of which form at least a part of the last gas space 7 as compared to one of the electrodes the gas space of which precedes that last gas space in the direction of the gas flow through which the same current flows. The same method of detecting and controlling the release of the cushion of inert gas may also generally be employed with hydrogen electrodes.

Figure 2:
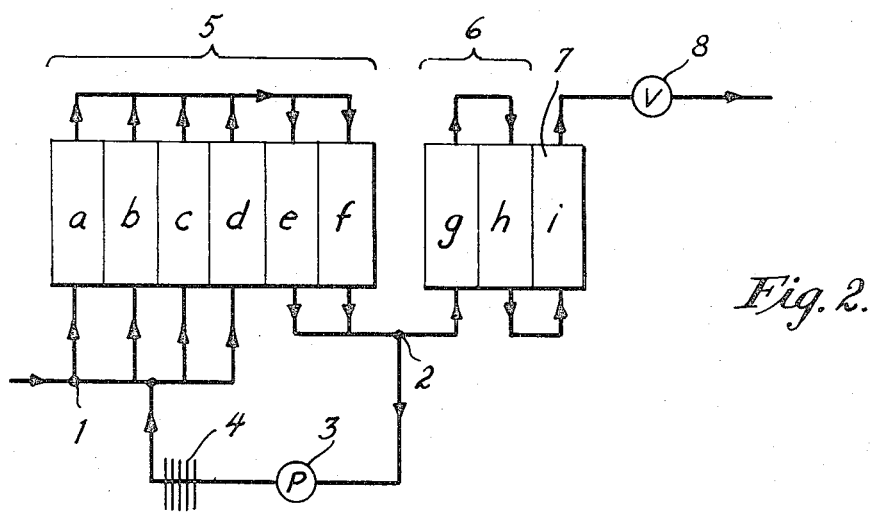

The advantageous embodiment of the invention wherein a partial, initial enrichment of the gas stream with inert gas is attained in the circulation system which contains the first group of gas spaces before feeding the gas to the second group of gas spaces is illustrated by FIG. 2.

Fresh gas is fed at 1, passes through the electrode gas spaces $a$ to $d$ of the first group 5 connected for gas passage in parallel and then the gas from electrodes $a$ to $d$ is passed through electrodes $e$ and $f$, also connected in parallel. The gas then flows through valve 2 through pump 3 and condenser 4 and then returns at 1. At valve 2 there is continuously removed gas and fed to the electrode gas spaces $g$, $h$ and $i$ of the second group wherein the gas is further enriched in its inert component which is then released at valve 8.

In accordance with this embodiment by the connection in series of the two sub-groups of the first groups, the number of electrode gas spaces contained in the second group, i.e. gas spaces 6 and 7 can be reduced because a greater partial enrichment in inert gas has already taken place in the first group of gas spaces than would have occurred if all gas spaces of that group would have been connected in parallel.

The process of the invention provides a further variant which is particularly suitable for use with nickel-containing hydrogen diffusion electrodes. With some of these electrodes a surface layer of nickel hydroxide may form in the electrode which corresponds to the last gas space of the second group as a result of the current being forced through this electrode at a reduced electrode potential. This layer of nickel hydroxide inactivates the electrode with respect to the electrochemical reaction of hydrogen. This disadvantage can be avoided with this type of electrode, by electrically connecting the last two electrodes of the second group of gas spaces in parallel while electrically connecting the preceding electrodes of the second group in series, while all gas spaces of the second group are connected in series. The formation of the cushion of inert gas in the last gas space is ascertained from the fact that the current which was initially delivered by the electrodes corresponding to the last and the penultimate gas spaces of the second group equally is now delivered solely or primarily by the penultimate electrode. The decrease of the electrical output of the last electrode and thus the formation of the cushion of inert gas can be readily determined as a drop of the current in the last electrode, and this drop of current is utilized for the control of the venting of the inert gas.

Figure 3:
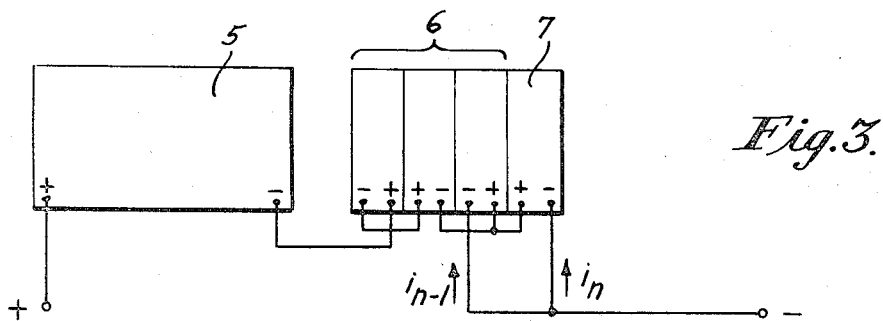
Figure 4:
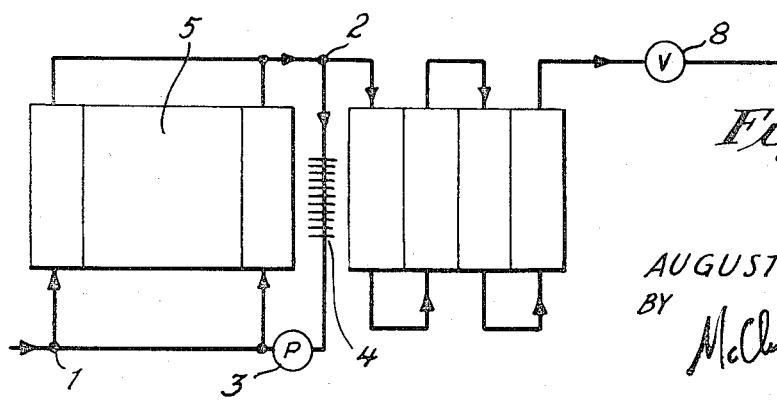

FIGS. 3 and 4 are diagrammatic representations of this embodiment, the figures showing the electrical connections of the cells of the battery and the gas flow on the hydrogen side through the two groups of gas spaces respectively. The cells containing the hydrogen electrode gas spaces of the first group 5 form a group of cells 5' which are electrically connected in series like the first two cells of the second group 6'. The cell 7' and the last cell of the group of cells 6' are electrically connected in parallel while the gas space 7 of the hydrogen electrode of cell 7' as is shown in FIG. 4 is connected in series with the gas spaces of all the hydrogen electrodes the cells of group 6' of FIG. 3. If the reaction gas were uncontaminated with inert gas the hydrogen electrodes $n$ and $n-1$ of the two cells of FIG. 3 which are connected in parallel would carry an equal current or $i_n = i_{n-1}$. Under choking effect of the inert gas, the current $i_n$ in the last hydrogen electrode $n$ decreases, whereas the electrode $n-1$ is forced to carry a greater load, thus giving the relation $i_{n-1} > i_n$. The relationship, i.e., the differential in the current is used to actuate the gas release valve 8.

In FIG. 4 the gas spaces 5 of the hydrogen electrodes of the cells 5' of FIG. 3 are connected in parallel. The fresh gas is supplied at 1, the gas for hydrogen electrodes of cells 6' and 7' is taken off at 2. The gas spaces 6 and 7 of the hydrogen electrodes of the cells 6' and 7' are connected in series so that the inert gas accumulates in gas space 7 and is released at valve 8.

FIG. 5 shows a fuel cell battery of the invention with its hydrogen diffusion electrodes and its oxygen diffusion electrodes. Hydrogen electrodes 51 and oxygen electrodes 52 are all constructed of five porous layers, two central catalytic working layers which have coarse pores, and two adjoining outer cover layers which have pores of an average smaller pore radius. The two central catalytic working layers 54 are arranged on both sides of the insulating layers 55, which are porous and electrically insulate the two halves of the electrode from each other. The catalytic working layers 54 of the hydrogen diffusion electrodes are sintered electrode bodies which contain carbonyl nickel and Raney nickel and the two cover layers 53 are made of copper powder and are sintered onto the catalytic layers. The oxygen diffusion electrodes have two cover layers 56 which are made of carbonyl nickel powder sintered onto the catalytically working layers 54a, which are made of Raney silver and carbonyl nickel powder.

Electrolyte chamber 51 is filled with an aqueous solution of 6 N potassium hydroxide. The gas spaces of the individual electrodes are defined in this particular case by the pore systems of the catalytic active layers of the electrodes and the pores of the insulating layer 55.

To the catalytic layer 54a of the oxygen electrodes there is connected an oxygen inlet which is supplied with high purity oxygen gas through conduct means 58 and 59. The terminal electrodes A and K have a compact end layer adjacent a single catalytic layer on one side and cover layer on the other side and do not have an insulating layer 55.

To the catalytic working layers of the individual hydrogen diffusion electrodes there are provided inlet and outlet means. The two gas spaces of electrodes A and C are connected in parallel to form the first group of gas spaces and are further connected with a gas circulation system 60. By supply means 61 there is provided to circulation system 60 from a suitable storage tank a gas mixture of the reactant gas hydrogen and the inert gas nitrogen and at the outlet means of the electrode gas spaces, the gas mixture is removed and is supplied to a water-cooled condenser. The water which has vaporized from the electrolyte menisci in the pores of the electrodes into the gas spaces and which is carried with the gas mixture through 62a into cooler 62 is condensed therein. The gas mixture which is considerably depleted of the water vapor is then returned over pump 63 into the gas spaces of the electrodes A and C. A portion of the gas mixture which exits from the electrodes and which is enriched in inert gas like nitrogen is removed prior to or after the condenser and this gas is fed through conduct 64 into the gas space of the subsequent electrode. The gas spaces of electrodes E, G and I are connected in series, in this order. By electrochemical conversion of the hydrogen gas, the concentration of inert nitrogen gas is gradually increased in this second group of gas spaces, so that finally the inert gas is released through valve 65. This inert gas can contain a residual amount of hydrogen gas as described in the above examples as well as a remainder of water vapor.

Valve 65 is controlled by control devie 66 in a known manner. The input leads 67 and 67a supply control device 66 with the potential of the two electrodes G and I.

Electrode I has a higher polarization potential than electrode G because of the higher concentration of inert gas contained in the gas mixture fed to this electrode. Valve 65 is actuated by control 66 by means of connections 68 and 68a, and this occurs when the concentration of inert gas in electrodes G and I exceeds a certain preselected value.

The control device can be so prearranged that the release of inert gases takes place either continuously or at spaced intervals.

The individual cells of the fuel cell battery are electrically connected in series by means of electrical connections 69 and the electrical load can be connected at connections 70 and 71.

In accordance with the method of the invention, the water removal and the venting of the inert gas can be both carried out continuously, both intermittently or either one can be carried out intermittently while the other is performed continuously. The venting of the gas is carried out intermittently when a voltage comparison and a telegraphic relay are used.

In one embodiment of the invention, the continuous release of inert gas is carried out with an oxyhydrogen analysis cell which is operated at constant cell voltage and in which the reaction gas concentration is measured at the battery outlet. The current of a gas diffusion electrode is a function of the gas composition when the potential, the gas stream, the gas pressure and the temperature are maintained constant. (Baucke & Winsel, Advd. E. Conv. 3, 613, 1963.) By means of the analysis cell, the gas valve is continuously so controlled that under all conditions the concentration of reaction gas in the gas vented is maintained at a selected value. In this manner, the electric potential of the electrochemical analysis cell is maintained constant and the gas release is continuous.

The gas venting and the water removal are not dependent on each other. The water removal is proportional to the flow of electrical current; the venting of the inert gas from the battery by means of the control system is determined for instance by the difference in potential between the penultimate and the last electrode with respect to the flow of the gas mixture.

The following examples further illustrate the process and apparatus of the invention without intending to be construed as a limitation thereto.

EXAMPLE 1

The process of the invention was employed for the operation of a fuel cell battery as illustrated above comprising 17 cells, using hydrogen gas and oxygen gas as the fuel and oxidant gas, respectively. The battery contained 17 double-layered hydrogen electrodes and oxygen electrodes each, with cover layers prepared from carbonyl nickel and working layers of carbonyl nickel with catalyst embedded therein (Raney-nickel on the hydrogen side, and precipitated silver on the oxygen side). The electrodes were framed in a cast of solidified epoxy resin shell so that a pair of hydrogen electrodes and a pair of oxygen electrodes each formed the respective gas space of 1 mm. thickness between the faces forming the gas sides of the electrodes. The electrolyte chamber formed between the electrodes of opposite polarity was 1 mm. thick and had a surface area of 160 cm.$^2$. Each gas space had a gas inlet and a gas outlet opening.

The gas spaces of the first 12 oxygen electrodes were communicatively connected in parallel and a circulatory system was established by the provision of suitable piping for the circulation of the oxygen gas, with a membrane pump and an air-cooled condenser included in the system, as described above.

The gas spaces of the remaining 5 oxygen electrodes formed the second group and were communicatively connected in series for the passing of the oxygen successively through the said gas spaces with a communicative connection of the oxygen inlet of this second group to the gas circulation system of the first group of gas spaces in a manner similar to that shown in FIG. 1. The gas outlet of the last oxygen electrode was provided with an electro-magnetically operated valve, which was electrically connected to a relay having two coils. The potential of the cell containing the penultimate oxygen electrode with respect to gas flow was applied to one of the coils of the relay, and the potential of the cell containing the last electrode was applied to the second coil of the relay. The magnetically operated valve was set in such manner that it was actuated and opened as soon as the difference between the potentials of the last and of the penultimate cell, caused by the cushion of inert gas establishing itself in the last electrode, exceeded a value of 50 mv. The valve could be set to be operated at any other selected value.

A gas mixture containing 99.5% of oxygen and 0.5% of nitrogen (by volume) was fed at inlet 1. The gas mixture flowed through the first twelve electrode gas spaces connected in parallel (first group 5 of gas spaces as shown in FIG. 1) and pumped by means of pump 3 through condenser 4.

This gas mixture was selected because it represents the most unfavorable composition of technical grade oxygen. The battery was heated to 60° C. by suitable heating means provided in the electrolyte circulation system. At this temperature, the battery could be continuously operated at an electrical load of up to 100 watts.

A portion of the gas is directed through 2 to the second group of gas spaces connected in series and belonging to the oxygen electrodes of the remaining 5 cells. The gas was vented intermittently at valve 8 at the selected potential difference.

For a current density of $j=50$ ma./cm.$^2$, corresponding to a current of $i=8$ A., the voltage of the battery was $v=14.7$ v. corresponding to a mean cell voltage of $v=865$ mv.

The volume of the gas mixture fed on the oxygen side at 1 from supply source 4' is 8.49 cm.$^3$ per sec.; at valve 8, the volume of the gas mixture vented amounted to 0.59 cm.$^3$ per sec. The volume of oxygen which was electrochemically converted was 7.9 cm.$^3$ per sec. All volumes refer to atmospheric pressure and a temperature of 20° C. The oxygen concentration of the vented gas amounted to 28% of oxygen content. This corresponds to a loss coefficient as follows:

$$\gamma = \left(\frac{\text{Volume of oxygen gas feed}}{\text{Volume of oxygen gas vented}}\right)^{-1} = 0.02$$

or a 2% loss of reaction gas.

The oxygen concentration in the gas circulation system of the first group of twelve electrode gas spaces connected in parallel was approxmiately the same as that of the concentration at the input, i.e., X=0.995%. The enrichment in inert gas took place in the second group of gas spaces formed by the five remaining gas spaces.

A difference in voltage $\Delta v$ of the last two cells of the battery with respect to oxygen flow of $\Delta v=50$ mv. was reached within 15 minutes. As soon as the inert gas was vented from the valve the voltage of the control cell, i.e. the last cell reverted to that of other cells which were not choked with inert gas. The cell remained at that voltage about 7 minutes, then in the next 8 minutes it decreased again by 50 mv.

Each gas release amounted to about an average volume of 51.3 cm.$^3$ of nitrogen and residual oxygen and occurred about each 15 minutes, thus amounting to an average rate of about 205 cm.$^3$ of gas per hour. The voltage of the battery decreased by 50 mv. in response to the increase in concentration of nitrogen on the oxygen side.

In the circulation system for the removal of the reaction water, there was collected by condensation 46 ml. of water per hour, this corresponding to the production from the current flow. The circulating volume of gas was 120 cm.$^2$/sec.

In the above example, the relay was actuated by the voltage of the last electrode of the second group and that of preceding electrode. Alternatively the voltage of control electrode is compared with a part of the total voltage of the entire battery. This obviates the necessity of connecting the control electrode with any one particular preceding electrode.

EXAMPLE 2

In a fuel cell battery similar to that described in Example 1, the gas spaces of the first 12 oxygen electrodes were connected communicatively in series instead of in parallel as in the battery described in Example 1.

With increasing proportion of inert gas in the mixture the telegraphic relay activated the venting valve more often repeatedly (5 to 6 times per minute) and reverted to a pattern of 15 minutes interval venting when the nitrogen content was adjusted to 0.5% by volume. During these variations in the gas mixture and release of inert gas, the water removal continued to take place independently of variations in the gas release. This arrangement resulted in a considerable increase in the resistance to the flow of the recirculated mixture of oxygen and nitrogen so that it was not possible any longer to circulate the mixture at a rate high enough to remove the entire amount of the reaction water produced at high electrical loads from the electrolyte by the circulation of the oxygen alone. A significant portion of the water could, however, be removed and collected by operating at a lower electrical load.

To operate a higher load and to remove all the water, the gas spaces of 12 hydrogen electrodes were, therefore, connected in parallel to form a first group and were also provided with a circulation system (separate from that of the oxygen) which comprised a forwarding pump for the hydrogen gas and a separate condenser. The remaining 5 hydrogen gas chambers were communicatively connected in series to form the second group of gas spaces and connected to the hydrogen gas circulation system, as described hereinbefore for the first group of oxygen gas spaces. The enrichment of the hydrogen gas stream by accumulating inert gas and the formation of a cushion of inert gas in the last gas space of the second group proceeded as described in Example 1. The inert gas was vented from the last gas space by means of a corresponding relay circuit and of a magnetically operated valve, for instance, a solenoid operated valve, controlled by this circuit in a manner similar to that described hereinbefore with respect to the oxygen gas system.

The two reactant gases were led counter-currently to each other through the gas space of the cells so that the formation of the cushion of inert gas and its preselected release was effected in the two respective end cells at opposite ends of the battery.

EXAMPLE 3

The battery of Example 1 was operated with highly impure commercial hydrogen. When the potential of the last electrode fell below that of the nickel hydroxide because of the impure hydrogen serious difficulties occurred. Accordingly, the gas spaces of the battery in which the hydrogen gas was conducted were connected so that only 10 of the 12 electrodes in the first group of hydrogen electrodes of the battery were communicatively connected into the hydrogen circulation system for the removal of the reaction water. The decrease of the hydrogen concentration in the circulating gas and the increase in the concentration of the inert component was effected in the hydrogen electrodes of the remaining 7 cells. The electrodes in the last two of these cells with respect to the direction of the flow of the hydrogen were electrically connected in parallel in such manner that the currents produced by the last two hydrogen electrodes were led over low ohmage coils before they were united. The said coils were wound on a ring-like iron core in such manner that their fields offset each other. In the air space of the ring-like magnet core was provided a Hall-effect generator, the voltage of which amplified in a suitable amplifier was utilized for the opening of the electromagnetically operated valve when the current ratio of the two currents in the coils was 1:3.

If the battery is operated under a heavy electrical load and is delivering strong currents, the current in the two above-described coils is initially essentially the same because of the identical composition of the impure hydrogen gas in the last two hydrogen electrodes. As the formation of the cushion of the inert gas in the last electrode proceeds, the last electrode gradually contributes less to the load current until the cushion of inert gas has been vented, thereby establishing the original condition in which the last and the penultimate electrodes contain hydrogen gas of substantially the same composition and inert gas and hydrogen content.

As is readily apparent, in this embodiment of the battery and of the method of operation, the last electrode has always the same potential as the penultimate electrode. In this manner, the formation of nickel hydroxide is effectively prevented and the reduction in the electrical output of the electrode is exclusively attributable to the formation of the cushion of the inert gas and is detected by a reduction of the electric current.

The relative number of electrode gas spaces in the first group as compared to the number of gas spaces in the second group for optimum operation can readily be determined by one skilled in the art. In particular, their number depends on the proportion of inert gas continually introduced into the battery with the feed gas, the speed of circulation in the system removing the water, the manner in which the gas spaces of the first group are connected (parallel or in series), and whether or not one or two of the gases are being dehumidified and then their inert components removed. When the amount of inert gas is low, the number of gas spaces in the first group is preferably high, for instance, in a ratio of 3 or more to 1, compared to the number in the second group. When the amount of inert gas is high, then it is desirable that the ratio be reduced to 2 to 1 or 1 to 1 or less.

The proportion of gas being flowed to recycle by gas proportioning means in comparison to the amount being flowed to the second group of gas spaces also will depend on various factors, including the amount of inert gas being introduced into the system. When the inert gas content is low, the ratio of the portion of the first group effluent gas going to the recirculation system to the portion going to the second group of gas spaces can be higher than 1 to 1, for instance, 5 to 1 by volume. When the inert gas content is high, the ratio can be lower than 1 to 1, for instance, 1 to 2.

Other fuel gases besides hydrogen can be used in the practice of the invention and include hydrocarbons, for instance, ethylene, propylene, natural gas, propane and n-butane. Likewise, other oxidant gases other than air or oxygen can be used. Catalysts and mixtures used in the porous gas diffusion electrodes can be any of the many known in the art, including platinum, nickel, carbonyl nickel and others as described, for example, by E. Justi in U.S. Pat. No. 2,860,175.

Among the various advantages of the process and apparatus of the invention, it is noteworthy that the invention makes it possible to remove essentially pure inert gas, i.e., free of utilizable gas from the battery while concurrently removing water of reaction from the system and also operate the battery on a higher concentration of reaction gas.

When the battery of Example 1 was compared with another similar battery operated in accordance with conventional procedure, under the same loads and same amount of water removal, at least 10% by volume of the gas fed was lost on venting.

In this case, for a current $i=8$ A., the vented gas volume was $V=0.88$ cm.$^3$/sec. The content of oxygen in the vented gas amounted to 95% of oxygen. A loss factor of $\gamma=0.1$ or 10% was therefore obtained. This is a usual value which cannot be decreased without loss of power of the battery. When a battery is operated in accordance with the process of the invention, the loss coefficient $\gamma$ is below 2%; values of 0.5% were obtained too.

It is also noteworthy that on the hydrogen side the advantage of the battery of the invention over the conventional one is even greater because enrichment of technical grade hydrogen can take a long time, about 10 hours, before the level of $\Delta v=50$ mv. is reached.

In accordance with the invention, there is obtained an economy of the electrochemically converted gas of about 10%, or an increase of electrical output of ten percent.

It is to be understood that the illustrations and descriptions of embodiments of the process and apparatus given herein are by way of example and that modifications may be made therein while retaining all or significant advantages and benefits of this invention, the various embodiments being defined in the following claims.

I claim:

1. In a method of removing water of reaction and venting inert gas during the electrochemical operation of a fuel cell battery while a mixture containing inert gas and reaction gas is fed to the electrodes, said battery having the gas spaces of a plurality of porous gas diffusion electrons of the same polarity interconnected and grouped into a first group, and a second group of gas spaces of at least one porous gas diffusion electrode connected in a series relative to the reaction gas flow, which method comprises withdrawing a portion of the reaction gas mixture containing reaction gas, inert gas and water vapor which flows out from the first group of electrode gas spaces, removing water therefrom to form a gas effluent substantially free of water and returning at least a part of said gas effluent to the reaction gas containing mixture which is fed to the first group of gas spaces, and conducting the remaining portion of the reaction gas mixture from said first group through the in series-connected gas spaces of said second group, and venting residual gas mixture from the last gas space of said second group of gas spaces when the concentration of inert gas causes a predetermined decrease in the output of electrical power.

2. The process of claim 1 in which the gas which is vented from said last gas space comprises a major proportion of inert gas.

3. The process of claim 2 in which the gas which is vented consists essentially of inert gas.

4. The process of claim 1 in which the venting of the inert gas takes place intermittently.

5. The process of claim 1 in which the venting of the inert gas takes place continuously.

6. The process of claim 1 which comprises feeding a second reaction gas admixed to an inert gas through a series of gas spaces of the respective gas diffusion electrodes of equal polarity, countercurrently to the first reaction gas.

7. In a method of removing water of reaction and venting inert gas during the electrochemical operation of a fuel cell battery while feeding a mixture containing inert gas and reaction gas to the electrodes, said battery having the gas spaces of a plurality of porous gas diffusion electrodes of the same polarity interconnected and grouped into a first group, and a second group of gas spaces of at least one porous gas diffusion electrode connected in series relative to the reaction gas flow, which method comprises withdrawing a portion of the reaction gas mixture containing reaction gas, inert gas and water vapor which flows out from the first group of electrode gas spaces, conducting the remaining portion of the reaction gas mixture from said first group to the second group of the gas spaces, passing at least a portion of said withdrawn gas mixture through a water-removal means, removing water therefrom to form an effluent gas substantially free of water and feeding at least a part of said effluent gas to the reaction gas containing mixture which is fed to the first group of gas spaces, while conducting the remaining portion of said effluent gas through the gas spaces of said in series-connected gas spaces of second group of gas spaces, and venting residual gas mixture from the last gas space of said second group of gas spaces when the concentration of inert gas causes a predetermined decrease in the output of electrical power of said battery.

8. The process of claim 7 in which the reaction gas is conducted through a first group of gas spaces of gas diffusion electrodes which are communicatively connected in parallel.

9. The process of claim 7 in which the reaction gas is conducted through a first group of gas diffusion electrodes, the gas spaces of some of which are communicatively connected in series.

10. The process of claim 7 in which the two last gas spaces in the second group of electrode gas spaces are communicatively connected in parallel.

11. The process of claim 7 wherein all of the withdrawn reaction gas mixture from the first group of electrodes is passed through a water-removal means forming an effluent substantially free of water and splitting said effluent into two portions, one which is fed to the first group of gas spaces with the reaction gas mixture and the second portion is fed to the gas spaces of the second group of gas spaces of the electrodes.

12. The process of claim 7 wherein the steps of passing at least a portion of said withdrawn gas mixture through a water-removal means, removing the water therefrom, flowing at least a part of said effluent of decreased water content to the reaction gas containing mixture which is fed to the first group of gas spaces, and flowing a part of said effluent gas through the gas space of the second group of electrodes is performed repeatedly over a plurality of cycles.

13. The process of claim 12 wherein the venting of the inert gas during a plurality of cycles of passing of the reaction gas mixture through the electrodes of the first or second group takes place at least for a part of the time concurrently with the removal of water from the gas effluent of the first group of gas diffusion electrodes.

14. The process of claim 7 which comprises the additional steps of feeding countercurrently to the first reaction gas a second reaction gas containing inert gas to a first group of interconnected gas spaces of porous gas diffusion electrodes of the same polarity, withdrawing a portion of the reaction gas mixture containing reaction gas, inert gas and water vapor which flows out from the first group of electrode gas spaces, passing at least a portion of said withdrawn gas mixture through a water-removal means, removing water therefrom to form a gas effluent substantially free of water and feeding at least a part of said effluent gas to the reaction gas containing mixture which is fed to the first group of gas spaces, while conducting the remaining portion of said effluent gas through the gas spaces of a second group of gas spaces of said in series-connected gas spaces of said second group of gas spaces and venting residual gas mixture from the last gas space of said second group of gas spaces when the concentration of inert gas causes a predetermined decrease in the output of electrical power of said battery, so that the venting of said second reaction gas takes place at the opposite end cell from that of the first reaction gas.

15. The process of claim 14 wherein one gas is oxygen and the other gas is hydrogen.

16. The process of claim 14 wherein all of the withdrawn reaction gas mixture is passed through a water-removal means forming an effluent substantially free of water and splitting said effluent into two portions, one which is fed to the first group of gas spaces with the reaction gas mixture and the second portion is fed to the gas spaces of the second group of gas spaces of the electrodes

References Cited
UNITED STATES PATENTS

| | | | |
|---|---|---|---|
| 3,198,664 | 8/1965 | Kunz | 136—86 |
| 3,201,283 | 8/1965 | Dengler | 136—86 |
| 3,256,116 | 6/1966 | Justi et al. | 136—86 |

ALLEN B. CURTIS, Primary Examiner